US010713780B2

(12) United States Patent
Xin et al.

(10) Patent No.: US 10,713,780 B2
(45) Date of Patent: Jul. 14, 2020

(54) COLOR QUALITY ASSESSMENT BASED ON MULTISPECTRAL IMAGING

(71) Applicant: The Hong Kong Research Institute of Textiles and Apparel Limited, Hong Kong (CN)

(72) Inventors: John Haozhong Xin, Hong Kong (CN); Hui-liang Shen, Hangzhou (CN); Quan-geng Ge, Hangzhou (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 90 days.

(21) Appl. No.: 16/215,734

(22) Filed: Dec. 11, 2018

(65) Prior Publication Data

US 2019/0180432 A1   Jun. 13, 2019

(30) Foreign Application Priority Data

Dec. 13, 2017  (CN) .......................... 2017 1 1329341

(51) Int. Cl.
*G06T 7/00* (2017.01)
*G06T 7/90* (2017.01)
(Continued)

(52) U.S. Cl.
CPC ............ *G06T 7/001* (2013.01); *G06K 9/6202* (2013.01); *G06K 9/6223* (2013.01); *G06T 7/11* (2017.01);
(Continued)

(58) Field of Classification Search
CPC ............ G06T 7/90; G06T 2207/20221; G06T 2207/30124; G06T 7/001; G06T 7/11;
(Continued)

(56) References Cited

U.S. PATENT DOCUMENTS 6,628,829 B1 * 9/2003 Chasen ..................... G01J 3/46
382/165
7,189,000 B2   3/2007 Miyauchi et al.
(Continued)

FOREIGN PATENT DOCUMENTS

CN      1033630 C    12/1996
EP      0609500 A1    8/1994
(Continued)

*Primary Examiner* — Yon J Couso
(74) *Attorney, Agent, or Firm* — Spruson & Ferguson (Hong Kong) Limited

(57) ABSTRACT

The present disclosure provides a method and a computer-readable storage medium for color quality assessment of a batch-sample image based on multispectral imaging. The method comprises: selecting an operation area on a reference image and locating a corresponding operation area on a batch-sample image, wherein the reference image is used for color comparison with the batch-sample image to determine whether the batch-sample image satisfies a pass requirement; generating and comparing the color-information items obtained from the reference image and from the batch-sample image respectively and determine whether the batch-sample image satisfies the pass requirement based on one or more thresholds. This method can be applied to automatically and precisely assess the quality of mixed-color fabrics in textile industry, which is more objective, reliable, and cost-effective, as compared to conventional methods for color quality assessment.

20 Claims, 9 Drawing Sheets

(51) Int. Cl.
  *G06K 9/62*   (2006.01)
  *G06T 7/174*  (2017.01)
  *G06T 7/11*   (2017.01)

(52) U.S. Cl.
  CPC ............... *G06T 7/174* (2017.01); *G06T 7/90* (2017.01); *G06T 2207/20221* (2013.01); *G06T 2207/30124* (2013.01)

(58) Field of Classification Search
  CPC .... G06T 7/174; G06K 9/4652; G06K 9/6202; G06K 9/6223
  See application file for complete search history.

(56) References Cited

U.S. PATENT DOCUMENTS

| | | | |
|---|---|---|---|
| 8,733,921 B2 | 5/2014 | Korem et al. | |
| 9,020,256 B2* | 4/2015 | Deskevich | G06T 5/003 |
| | | | 382/167 |
| 2012/0099788 A1* | 4/2012 | Bhatti | G01J 3/462 |
| | | | 382/167 |
| 2014/0126790 A1 | 5/2014 | Duchesne et al. | |
| 2015/0243041 A1* | 8/2015 | Panetta | G06F 16/50 |
| | | | 382/164 |

FOREIGN PATENT DOCUMENTS

| | | | |
|---|---|---|---|
| WO | 9531869 A1 | 11/1995 | |
| WO | 2007021467 A2 | 2/2007 | |

* cited by examiner

COLOR QUALITY ASSESSMENT BASED ON MULTISPECTRAL IMAGING

CROSS REFERENCE TO RELATED APPLICATION

This application claims priority to CN201711329341.3 filed on Dec. 13, 2017, the disclosure of which is hereby incorporated by reference in its entirety.

FIELD OF THE INVENTION

The present disclosure relates to a method for color quality assessment based on multispectral imaging.

BACKGROUND

In the textile industry, it is very challenging to mass produce batch-sample fabrics that meet customer's requirements based on images of a standard sample or computer-aided design (CAD) images. Major difficulties include accurately assessing the color and/or shape of an image for a batch sample with respective to an image for a standard sample or an image for a CAD design.

At present, a large portion of traditional textile industry are still relying on manual assessment using an image of a batch sample and an image of a standard sample or a CAD image to determine whether a batch sample meets the standards for mass production. The manual assessment requires experienced operators, imposing high cost for quality control in the textile industry. Even with experienced operators, the assessment is still subject to large variations when assessing at different times, conditions, and with different operators. This would lead to inconsistency in the produced batches of samples. It also increases the chances of producing unqualified batch samples.

Some of nowadays textile factories have started to use standard colorimeters for quality assessment, to solve the aforementioned problems of unreliability and irreproducibility in manual assessment. Currently, there are a variety of colorimeters with different advantages. For example, a portable colorimeter has advantages, such as handy, reading data directly, and connectable to a computer; a desktop colorimeter has advantages, such as stable performance, and suitable for partially-translucent objects; an online spectrophotometer has advantages, such as suitable for use during production in production workshops, which greatly improves production efficiency and quality.

However, the colorimeters currently used in the textile industry can only perform information extraction and quality assessment for pure colors (i.e. single colors). Quality of mixed-color fabrics cannot be assessed using the existing colorimeters. For example, an instruction manual of one existing colorimeter for color measurement clearly states that "a small piece of sample cloth delivered by a material control personnel should be visually assessed if it cannot be assessed by machine; if the sample cloth can be assessed by machine, assess it with the colorimeter followed by re-assessment visually". In other words, it is difficult for the colorimeter to perform color assessment for mixed-color fabrics.

To solve the problem that color quality of mixed-color fabrics cannot be assessed by colorimeters, the present disclosure provides a new method for assessing the quality of mixed-color fabrics based on multispectral imaging of the mixed-color fabrics. The present disclosure also provides a computer-readable storage medium to implement the method. Furthermore, other desirable features and characteristics of the method will become apparent from the subsequent detailed description and the appended claims, taken in conjunction with the accompanying drawings and this background of the disclosure.

SUMMARY OF THE INVENTION

To solve the aforementioned problems, the present disclosure provides a computer-implemented method for color quality assessment of a batch-sample image based on multispectral imaging. The method starts from a multispectral image of a batch sample and a reference image (such as a multispectral image of a standard sample or a CAD image), to obtain color differences between the image of a batch sample and the reference image. The color differences are summarized in a tabular form or are annotated in a spatial heat map (i.e. a color difference map), so that a user can directly determine if a batch sample meets the standards based on the tabular data, the heat map, or both.

In a first aspect of the present disclosure, there is provided a computer-implemented method for color quality assessment of a batch-sample image based on multispectral imaging, the method comprising the steps of: (a) selecting an operation area on a reference image, wherein the reference image is used for color comparison with the batch-sample image to determine whether the batch-sample image satisfies a pass requirement; (b) locating a corresponding operation area on the batch-sample image for color comparison, wherein the corresponding operation area on the batch-sample image matches the operation area on the reference image; (c) generating a first plurality of color-information items for the reference image based on colors measured at a plurality of first locations on the operation area, and a second plurality of color-information items for the batch-sample image based on colors measured at a plurality of second locations on the corresponding operation area, wherein the first locations on the operation area respectively correspond to the second locations on the corresponding operation area; (d) comparing the first and second pluralities of color-information items to obtain a plurality of comparison results; and (e) determining whether the batch-sample image satisfies the pass requirement, wherein the step (e) includes checking the plurality of comparison results with one or more thresholds.

In a first embodiment of the first aspect of the present disclosure, the plurality of comparison results comprises a plurality of color differences each being a difference in color between one of the first locations and a respective second location.

In a second embodiment of the first aspect of the present disclosure, the step (b) includes using an image matching algorithm to locate the corresponding operation area, and wherein the image matching algorithm is selected from a NTG-model based image matching algorithm, a classical SIFT algorithm, a MAD algorithm, a SAD algorithm and a NCC algorithm.

In a third embodiment of the first aspect of the present disclosure, the plurality of second locations on the corresponding operation area in the step (c) are obtained by manual selection or automatic matching, so that the first locations on the operation area respectively correspond to the second locations on the corresponding operation area.

In a fourth embodiment of the first aspect of the present disclosure, the step (c) includes applying an image segmentation algorithm to the operation area and to the corresponding operation area to obtain the first and second pluralities of color-information items, respectively.

In a fifth embodiment of the first aspect of the present disclosure, the method further comprising the steps of: (f) fusing the reference image with the batch-sample image such that the corresponding operation area overlaps on the operation area; and (g) obtaining a color difference map between the reference image and the batch-sample image according to a color difference equation.

In a sixth embodiment of the first aspect of the present disclosure, the reference image is a CAD image or a standard-sample image.

In a seventh embodiment of the first aspect of the present disclosure, the reference image is a standard-sample image, and wherein the step (c) includes: selecting a first plurality of seed points having mutually different colors on the operation area of the standard-sample image, wherein the first plurality of seed points form the plurality of first locations; identifying a second plurality of seed points on the corresponding operation area of the batch-sample image, wherein the second plurality of seed points corresponds to the first plurality of seed points in position, and form the plurality of second locations; and applying an image segmentation algorithm to the operation area and to the corresponding operation area to obtain the first and second pluralities of color-information items, respectively.

In an eighth embodiment of the first aspect of the present disclosure, the plurality of comparison results and whether the batch-sample image satisfies the pass requirement are presented in a printable tabular form.

In a second aspect of the present disclosure, there is provided a computer-implemented method for color quality assessment of a batch-sample image based on multispectral imaging, the method comprising the steps of: (a) selecting an operation area on a reference image, wherein the reference image is used for color comparison with the batch-sample image to determine whether the batch-sample image satisfies a pass requirement; (b) locating a corresponding operation area on a batch-sample image for color comparison, wherein the corresponding operation area on the batch-sample image matches the operation area on the reference image; (c) fusing the reference image with the batch-sample image such that the corresponding operation area overlaps on the operation area; and (d) obtaining a color difference map between the reference image and the batch-sample image according to a color difference equation, the color difference map being used for color quality assessment.

In a first embodiment of the second aspect of the present disclosure, the step (b) includes using an image matching algorithm to locate the corresponding operation area, and wherein the image matching algorithm is selected from a NTG-model based image matching algorithm, a classical SIFT algorithm, a MAD algorithm, a SAD algorithm and a NCC algorithm.

In a second embodiment of the second aspect of the present disclosure, the color difference equation is selected from a DECMC (2:1), a CIEDE2000, a CIELAB, and a CIE94.

In a third embodiment of the second aspect of the present disclosure, the reference image is a CAD image or a standard-sample image.

In a third aspect of the present disclosure, there is provided a non-transitory computer-readable storage medium having stored thereon computer instructions, wherein the computer instructions, when executed by a processor, causes the processor to perform color quality assessment of a batch-sample image according to the method provided in the first aspect of the present disclosure.

In a fourth aspect of the present disclosure, there is provided a non-transitory computer-readable storage medium having stored thereon computer instructions, wherein the computer instructions, when executed by a processor, causes the processor to perform color quality assessment of a batch-sample image according to the method provided in the second aspect of the present disclosure.

The invention includes all such variation and modifications. The invention also includes all of the steps and features referred to or indicated in the specification, individually or collectively and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but excludes elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF THE DRAWINGS

The present disclosure will be further described with reference to figures and embodiments hereinafter, and in the figures.

DETAILED DESCRIPTION

The following detailed description provides exemplary embodiments of the present invention and is not intended to limit the scope or applicability of the present invention in any way. Rather, the following detailed description is intended to provide examples of various embodiments for practicing the invention.

Currently, automatic methods of shape and/or color quality assessment for mixed-color fabrics are lacking in the textile industry. The disclosed method is advantageously used for the textile industry in color quality assessment for mixed-color fabrics. Additionally, the method will be illustrated hereinafter under an application of the disclosed method to color quality assessment for mixed-color fabrics. Nonetheless, it is not intended that the disclosed method is exclusively used for the textile industry. The disclosed method may be used in other industries such as the printing industry.

Figure 1:
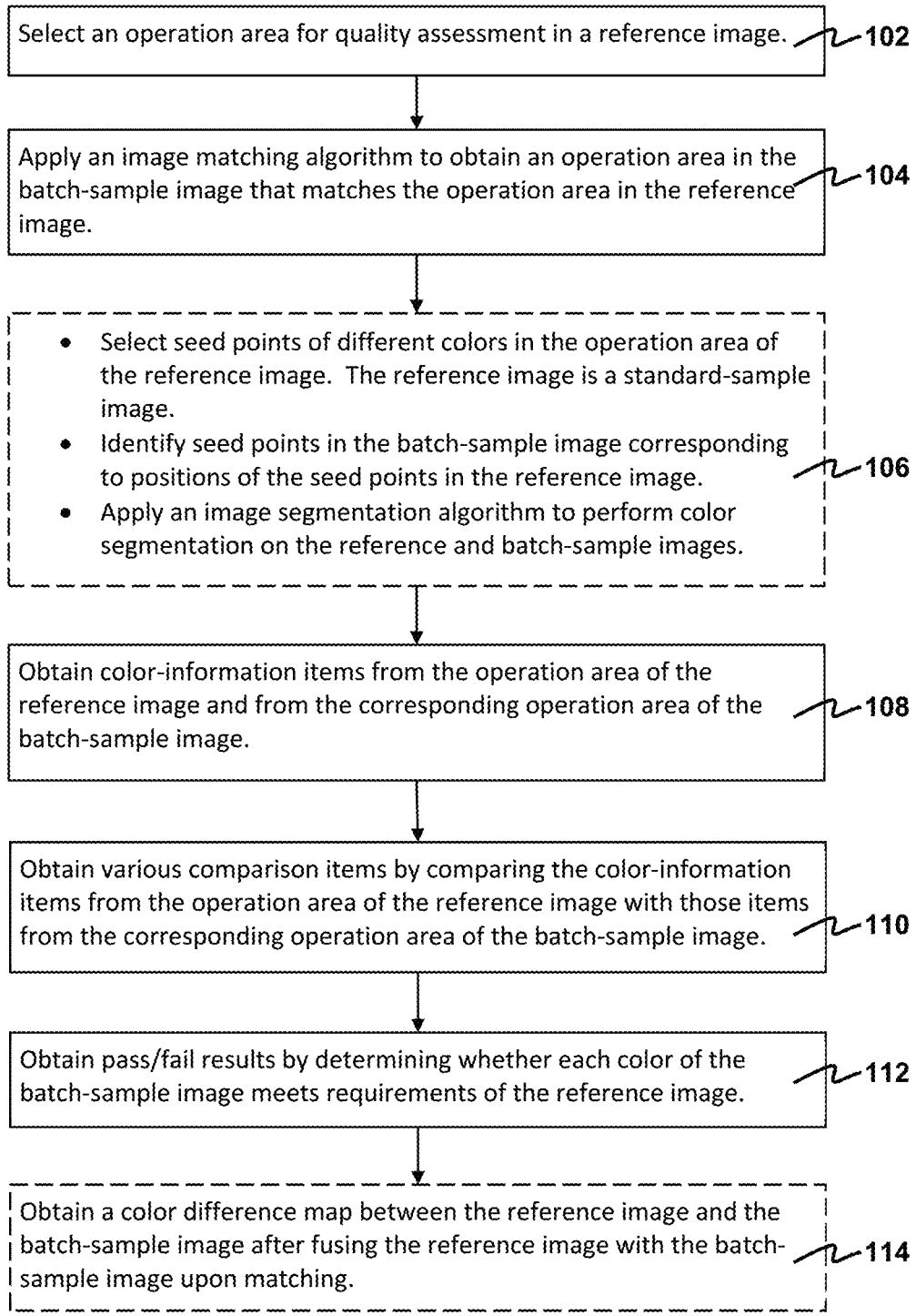
FIG. 1 is a flowchart of the method of quality assessment based on multispectral imaging according to one embodiment of the present disclosure.

The disclosed method is exemplarily illustrated with the aid of FIG. 1. FIG. 1 is a flowchart of a color quality assessment method based on multispectral imaging according to one embodiment of the present disclosure. The standard-sample image, as a reference image, and the batch-sample image of a mixed-color fabric can be preferably obtained using a multispectral imaging system. As used herein, the term "reference image" refers to an image that serves as a reference for quality assessment. In the present disclosure, a "reference image" in general means a standard-sample image or a CAD image. The term "standard-sample image" refers to a multispectral image of a standard sample. The term "batch-sample image" refers to a multispectral image of a particular sample that is manufactured in a batch in mass production. The term "CAD image" refers to a computer-generated image and serves as a reference model of a fabric that is manufactured. The term "standard sample" refers to a sample of a fabric used as a reference for evaluating or assessing other samples. The term "batch sample" refers to a sample manufactured in mass production.

In the disclosed method, an operation area from a reference image is selected (step 102), and then a corresponding operation area on a batch-sample image is located (step 104). The reference image is used for color comparison with the batch-sample image to determine whether the batch-sample image satisfies a certain pass requirement, such as a maximum tolerable color difference between the batch-sample image and the reference image. The term "operation area" or "corresponding operation area" refers to a particular area of focus on which color quality assessment is conducted. Generally, an image matching algorithm is used in identifying the corresponding operation area based on the operation area.

As used herein, the term "image matching" refers to a process of aligning two or more images such that the same scene overlaps on the two or more images. The two or more images may be offset in position or in shape due to differences in collection time, in an angle used in image capturing or even in collection equipment. Particularly in the textile industry, there is often translational and rotational transformation in the actual acquisition of standard-sample images and batch-sample images. Since a woven fabric made from a yarn is a non-rigid body, there may be deformations such as scaling, shear mapping, etc., resulting in misalignment between the batch-sample image and the given standard-sample image. In this case, image matching is particularly important since it helps quickly find operation areas with the same texture and/or pattern in the reference image and the batch-sample image for immediate quality assessment. Compared to manual alignment between a standard sample and a batch sample during conventional quality assessment of fabrics, the step of automatic image matching using an image matching algorithm significantly improves the accuracy and efficiency of quality assessment.

Automatic image matching mainly comprises the following steps.

1) Feature detection: Feature detection on the operation area of the reference image and the corresponding operation area of the batch-sample image can be performed using point feature extraction (Harris operator, SUSAN corner detector, etc.), line feature extraction (such as Laplacian of Gaussian (LoG), Canny edge detector), Fourier transformation, Gabor transformation, least squares method, boundary direction histogram method, and the like.

2) Feature matching: The features detected in the first step are matched one by one between the reference image and the batch-sample image. The process of feature matching is equivalent to a process of estimating transforming parameters. Therefore, steps 2) and 3) are practically carried out in one step. The method of feature matching includes area-based feature matching and feature-based feature matching.

3) Transformation model estimation: After feature matching, selecting mapping relationship between images and estimating parameters of the mapping relationship are required. The mapping relationship can be selected based on the assumed geometric deformation between the image to be matched and the reference image, such as affine transformation, rigid body transformation, projection transformation, non-linear transformation, and the like. The mode of geometric deformation between the image to be matched and the reference image includes global transformation and local transformation. In the global transformation, the entire image to be matched and the reference image follow a unified mapping relationship. In contrast, the local transformation divides the image to be matched into several blocks, each of which follows their respective mapping relationship. For the global transformation, a binary polynomial model can be used, wherein the similarity transformation, as the simplest model, includes rotation, scaling and translation transformation, and is expressed in the equations below:

$$u = s(x\cos(\varphi) - y\sin(\varphi)) + t_x,$$

$$v = s(x\sin(\varphi) + y\cos(\varphi)) + t_y, \quad (1)$$

where: s is the scaling factor; $\varphi$ is the rotation angle; and $t_x$ and $t_y$ are the horizontal and vertical translational shifts, respectively. This transformation only includes rotation, scaling and translation. Since the similarity transformation retains features such as angle and curvature, it is commonly referred to as "conformal transformation", meaning that the shape of the geometry does not change. The similarity transformation contains four unknown parameters, and the general solution requires at least 2 pairs of coordinates.

Another type of transformation model is the affine transformation, expressed by the equations below:

$$u = a_{11}x + a_{12}y + t_x,$$

$$v = b_{21}x + b_{22}y + t_x, \qquad (2)$$

where: $a_{11}$, $a_{12}$, $b_{21}$ and $b_{22}$ are transformation parameters; and $t_x$ and $t_y$ are the horizontal and vertical translational shifts, respectively. The affine transformation includes rotation, scaling, translation, and shear mapping. Affine transformations preserve the flatness and straightness of the geometric shape, meaning that an original pair of parallel lines retains its parallelism after affine transformation. For example, a rectangle can be transformed into a parallelogram after the affine transformation. The affine transformation contains 6 unknown parameters, solution of which requires information of at least 3 known pairs of coordinates.

4) Image resampling and transformation: After the transformation model is determined and the parameters are estimated, the selected transformation approach can be performed on the image to be matched, by either forward mapping or reverse mapping, to obtain the target image. The aforementioned term "image to be matched" refers to an image that is used to match with another image (e.g., a standard-sample image) or a portion of another image (e.g., an operation area of a standard-sample image). Examples of an image to be matched include a batch-sample image or the corresponding operation area thereof. The aforementioned term "target image" refers to a newly generated image after transforming from a certain portion of an image to be matched (e.g., the corresponding operation area of a batch-sample image) and matches with a portion of another image (e.g. operation area of a standard-sample image).

The forward mapping starts from each pixel of the image to be matched, and calculates the corresponding pixel coordinates of the target image using the selected transformation model, and then assigns the gray value of the pixel from the image to be matched to the corresponding pixel of the target image. However, this method creates empty holes or overlaps in the target image.

Contrary to the forward mapping, the reverse mapping starts from each pixel of the target image, and calculates the corresponding pixel coordinates of the image to be matched using the reverse mapping of the transformation model, and then assigns the grey value of the pixel from the image to be matched to the corresponding pixel on the target image. This method does not create holes or overlaps in the target image.

In the embodiment shown in FIG. 1, the image matching algorithm preferably used in step 104 is the normalized total gradient (NTG)-based algorithm, which is a metric algorithm that measures the matching degree between two images based on information of image gradient. The NTG value, with a range of [0, 1], is obtained by normalizing the total gradient of the difference map between two images. The NTG value of 0 indicates that the two images are perfectly matched, and the NTG value of 1 indicates that the two images do not match. Therefore, the matching position and transformation parameters of two images can be obtained by finding the position with the smallest NTG value.

The NTG value of two images $f_r$ and $f_t$ can be calculated by the following equation:

$$NTG(f_x, f_t) = \frac{\|f_{r,x} - f_{t,x}\|_1 + \|f_{r,y} - f_{t,y}\|_1}{\|f_{r,x}\|_1 + \|f_{t,x}\|_1 + \|f_{r,y}\|_1 + \|f_{t,y}\|_1} \qquad (3)$$

where: $f_{r,x}$ and $f_{r,y}$ are the gradients of the image $f_r$ in the x and y directions, respectively; and $f_{t,x}$ and $f_{t,y}$ are the gradients of the image $f_t$ in the x and y directions, respectively. Compared to other similarity metrics, NTG, which takes advantage of the sparseness of image gradient, has a higher computational efficiency and a greater robustness to local intensity changes of images, and exhibits excellent performance especially for matching multispectral images.

Figure 2:
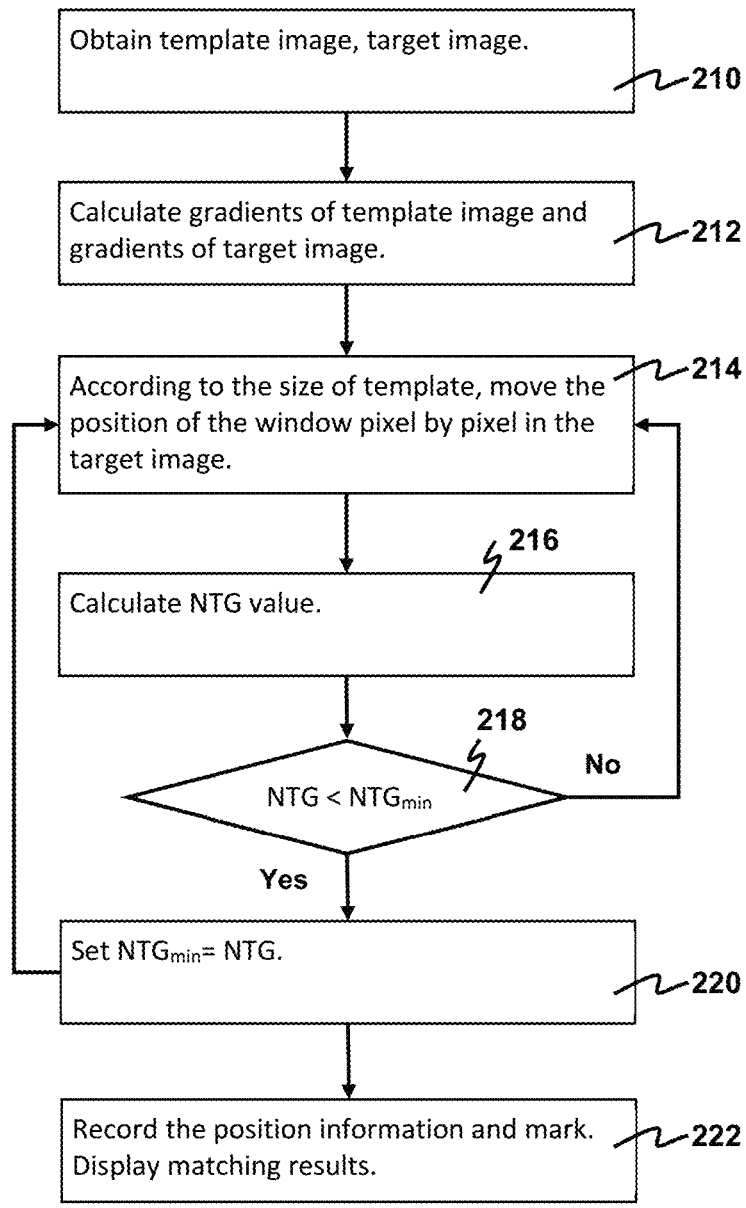
FIG. 2 is a flowchart of the NTG-model based image matching algorithm according to one embodiment of the present disclosure.

Furthermore, as shown in FIG. 2, the NTG-based image matching algorithm basically can be implemented by the following steps.

1) Obtain a template image from the reference image and a target image (step 210). The aforementioned term "template image" refers to a small image of the operation area from the reference image, and the aforementioned term "target image" refers to the full image to be matched, for example, a batch-sample image.
2) Crop a window with the same size of the template image on the target image and shifting the window pixel by pixel in a certain direction, (for example, from left to right and from top to bottom). Calculate the gradients of the template image and the target image within the window, respectively (step 212).
3) Substitute the values of gradients of the template image and the target image within the window calculated in the step 2) into EQN. (3) to calculate the NTG value of the template image and the target image within the window (steps 214, 216, 218, 220).
4) Record the position with the smallest NTG value during the movement (step 222). This position is where the target image matches the template image.
5) Mark the matching result recognized by the template image on the target image. Display the result on the target image (the step 222).

For global matching between the reference image and the image to be matched (i.e. batch-sample image), the reference image is divided into several template images and the batch-sample image is divided into several target images in the same manner. The best matching position is found between each template image and each target image according to steps 1)-3) disclosed above. Centers of each pair of matched images are then taken as a pair of matching points, which can be used to calculate parameters of global transformation model of the images.

Other matching algorithms may also be used within the contemplation of the present disclosure. For instance, matching algorithms, such as classical SIFT algorithm, MAD algorithm, SAD algorithm and NCC algorithm, can also be applied to the disclosed method of the present disclosure.

The image matching process is immediately followed by a process of image segmentation to obtain color-information items, especially when the reference image is a standard-sample image. As used herein, the term "color-information items" refers to any item of information describing a certain color, such as an L*a*b value, an RGB value, and a CMYK value. This process first involves selecting seed points on the operation area of the standard-sample image, which is then followed by obtaining seed points in the batch-sample image by manual selection or automatic matching, so that the seed points in the batch-sample image correspond to the seed points in the standard-sample image. As used herein, the term "seed point" refers to a pixel point of a certain color, which serves as an initial cluster center for applying an image segmentation algorithm, especially the K-Means clustering-based image segmentation algorithm, as will be described in detail in the following sections.

According to FIG. 1, the image segmentation includes the following steps (as indicated in step 106): selecting seed points having mutually different colors on the operation area of a standard-sample image; identifying, by automatic matching or manual selection, seed points from the corresponding operation area of the batch-sample image, said seed points corresponding to the positions of the seed points in the standard-sample image; and applying an image segmentation algorithm to perform color segmentation operations on the operation area of the standard-sample image and the corresponding operation area of the batch-sample image respectively to obtain respective color information (for example, the color value of a pixel).

The step of image segmentation is a critical for image analysis, especially for multispectral images. The accuracy of segmentation directly affects the color information extracted from samples. The importance of image segmentation has been highly recognized since the 1970s. After years of development, the major methods of image segmentation include threshold segmentation, edge-based segmentation, region-based segmentation, mathematical morphology-based segmentation, fuzzy technology-based segmentation, segmentation based on artificial neural network or genetic algorithm, and the like.

Figure 3:
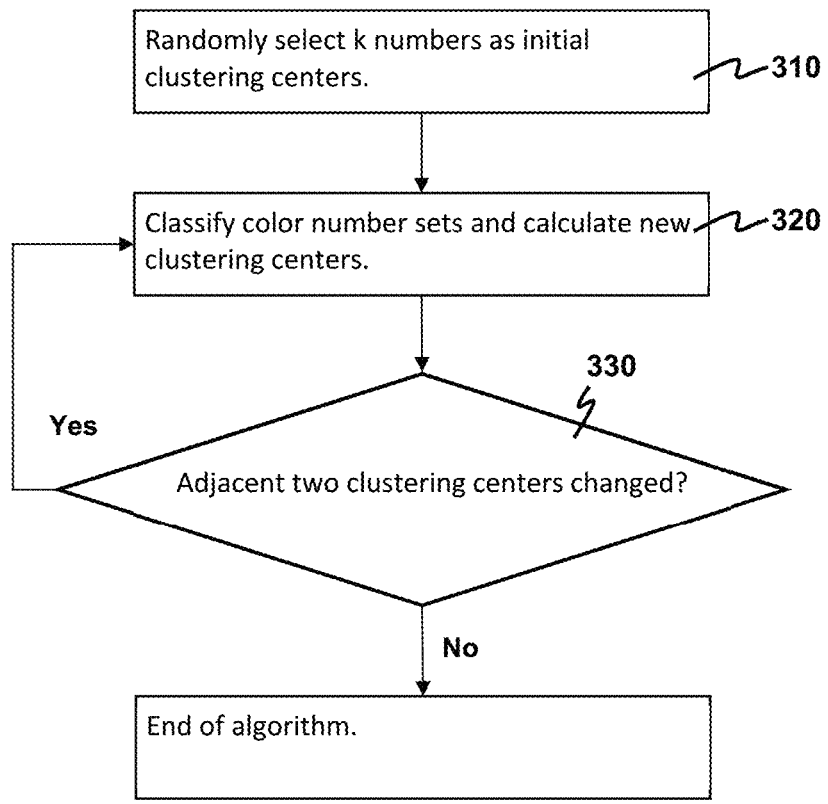
FIG. 3 is a flowchart of an image segmentation algorithm based on K-Means clustering according to one embodiment of the present disclosure.

The image segmentation method according to a preferred embodiment of the present disclosure is a K-Means clustering-based image segmentation. FIG. 3 is a flowchart of the K-Means clustering-based image segmentation according to one embodiment of the present disclosure. As shown in FIG. 3, the K-Means clustering-based image segmentation includes the following steps.

1) Provide a number set $X=\{x_1, x_2, \ldots, x_n\}$ with a size of n, and randomly select k numbers from the number set as a set of initial cluster centers $V(1)=\{v_1, v_2, \ldots, v_n\}$, where $1<k<n$ (step 310).

2) Calculate the distance between each remaining number in the number set $X=\{x_1, x_2, \ldots, x_n\}$ and each cluster center from $V(1)=\{v_1, v_2, \ldots, v_n\}$. The distance set is $D(x_i,v_j)$, where $1 \le i \le n$ and $1 \le j \le k$. If $D(x_i,v_w)=\min(D(x_i,v_j),\ j=1, 2, \ldots, k)$, then $x_i \in C_w$, $C_w$ is the number set of wth class, with the number $v_w$ as the cluster center (step 320).

3) Calculate a new cluster center of the number set of each class $v_i = n_i^{-1}\sum_{n=1}^{n_i} x_n$, so as to obtain a new set of cluster centers V(m), where V(m) is the set of cluster centers in the $m^{th}$ calculation, and $n_i$ is the size of the number set of $i^{th}$ class (the step 320).

4) Determine whether the cluster centers of two adjacent calculations change, with a sum of error squares J as the criterion function:

$$J=\|V(m)-V(m-1)\|^2.$$

If $J<\varepsilon$, the calculation ends; otherwise, return to step 2) to continue the iteration, where $\in$ is the error tolerance (step 330).

Due to the similarity among some color values after image segmentation by the K-Means clustering-based image segmentation algorithm, the edge part contains a lot of noise that affects the accuracy of extracted color information to some degree. Therefore, the present disclosure further comprises a one-step image erosion operation after the image segmentation is completed. In particular, 2-5 pixels in the edge part between two colors are deleted. The number of pixels that need to be eroded can be modified depending on specific characteristics of the sample.

In a preferred embodiment of the present disclosure, the image erosion operation includes the following steps.

After the image segmentation is completed, mark each class of colors by a color scale, and scan each pixel of an image by a 3×3 (corresponding to eroding two pixels) structure element.

Perform the "AND gate" operation with the structure element and the marked image covered thereby. If the value corresponding to the color scale is the same, the color scale for the pixel maintains the same; otherwise, the pixel is marked as a point to be eroded (marked with a rare color scale), and also the color information of the pixel should be removed and is not used in the final quantification of color information.

This image erosion operation is carried out after the above-mentioned step 4) is performed.

Other segmentation algorithms can also be used and are within the contemplation of the present disclosure. For instance, segmentation algorithms, such as the FLICM algorithm, the edge-based algorithm, and the region-based algorithm (for example, the regional growth method, the regional division and merger method, and the watershed method), can also be used, depending on properties (including materials, texture, and surface roughness thereof, etc.) of a sample.

As a result of obtaining color-information items, it is generated: a first plurality of color-information items for the reference image based on colors measured at a plurality of first locations on the operation area; and a second plurality of color-information items for the batch-sample image based on colors measured at a plurality of second locations on the corresponding operation area (step 108). The first locations on the operation area respectively correspond to the second locations on the corresponding operation area. In one embodiment, the aforementioned first locations are the locations of seed points on the operation area of the standard-sample image, or of the reference image in general. Similarly, the aforementioned second locations may be the locations of seed points on the corresponding operation area of the batch-sample image.

Finally, as shown in FIG. 1, the quality assessment based on multispectral imaging is carried out by comparing the first and second pluralities of color-information items to obtain various comparison items (for example, color difference) gathered to form a plurality of comparison results (step 110).

Based on a certain threshold (for instance, a certain value such that the color difference between the reference image and the batch-sample image should be no greater than this value), a user can determine whether each color in the batch-sample image meets the requirements of the reference image (step 112). The requirements of the reference image are collectively the pass requirement for the batch-sample image. Whether the batch-sample image satisfies the pass requirement is thus determined by at least checking the plurality of comparison results with one or more thresholds.

Figure 4A:
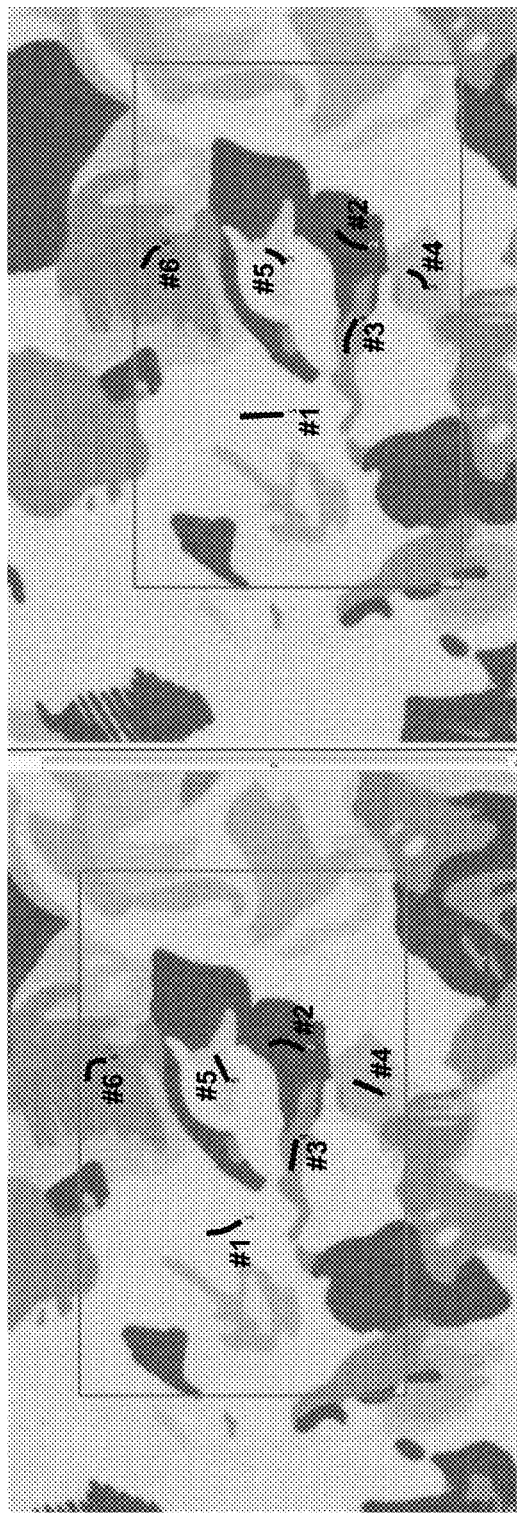
FIG. 4A shows, as an illustrative example, a multispectral image of a standard sample on the left, and a multispectral image of a batch sample on the right, different colors within the multispectral images being marked with Arabic numbers.
Figure 4B:
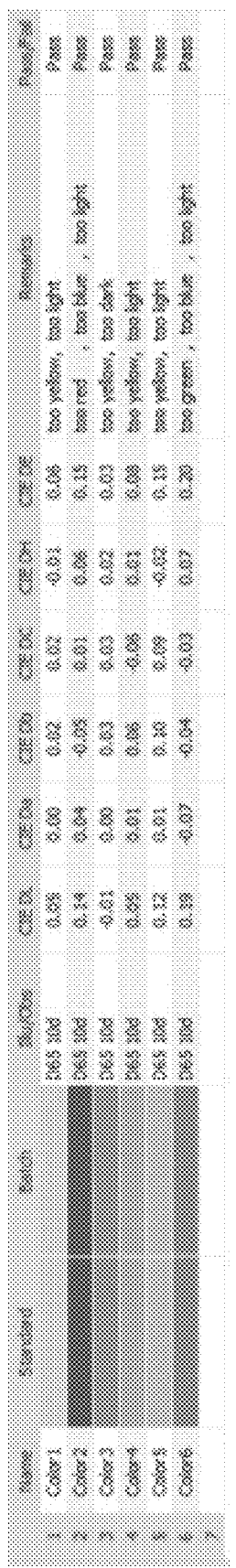
FIG. 4B shows, as an illustrative example, a table having comparison results and assessment results of the colors marked with Arabic numbers from FIG. 4A.

FIG. 4A shows the results of quality assessment between the standard-sample image (on the left) and the batch-sample image (on the right) of a fabric according to one embodiment of the present disclosure. The operation area on the standard-sample image and the corresponding matched operation area on the batch-sample image are marked in rectangular boxes. Within the operation area of the standard-sample image and the corresponding operation area of the batch-sample image, six different colors are identified and indicated with Arabic numbers 1 to 6 after the step of image segmentation described above is performed. The color-information items and comparison items of the six identified colors are summarized in a table shown in FIG. 4B. In the table, "Illu/Obs" indicates the light source—the software includes a variety of light sources, each corresponding to a particular color temperature; "CIE DL", "CIE Da", and "CIE Db" respectively indicate the difference of a pair of colors in the L, a, and b vectors respectively of the LAB color space; "CIE DC" indicates the difference in saturation between a pair of colors; "CIE DH" indicates the difference in hue between a pair of colors; and "CIE DE" indicates the color difference." By setting a threshold, the table in FIG. 4B also includes the pass/fail results, indicating whether each identified color in the batch-sample image meets the requirements of the standard-sample image. In this way, when the method is implemented in software, a user simply needs to select an operation area and select seed points within the operation area on the standard-sample image and the corresponding operation area on the batch-sample image. The user can obtain a pass/fail result for each color of the batch-sample image automatically and quickly. These quality assessment results can be intuitively viewed in a tabular form. The table can be displayed on a computer screen, and can also be saved or printed. It takes less than 30 seconds from importing the images to obtaining the pass/fail results. The accuracy of such color quality assessment is much higher than manual assessment that extensively relies on the experience of a technician as well as his subjective judgment. While traditional approach for color assessment of a fabric batch is largely experience dependent, the method provided herein only requires simple knowledge of computer, which is much more cost effective to the textile industry. When used in the textile industry, the disclosed method shows a lot of significant advantages, including but not limited to, involving only simple operations, providing accurate results, saving costs, and ultimately increasing a degree of automation in color quality assessment of qualified products.

In another embodiment, the reference image is a CAD image. Since a CAD image itself contains color information, the color values of pixels in the corresponding operation area of the batch-sample image can be directly obtained after image matching is done. Consequently, the step of image segmentation for extracting color information is not required for a CAD image.

Figure 5:
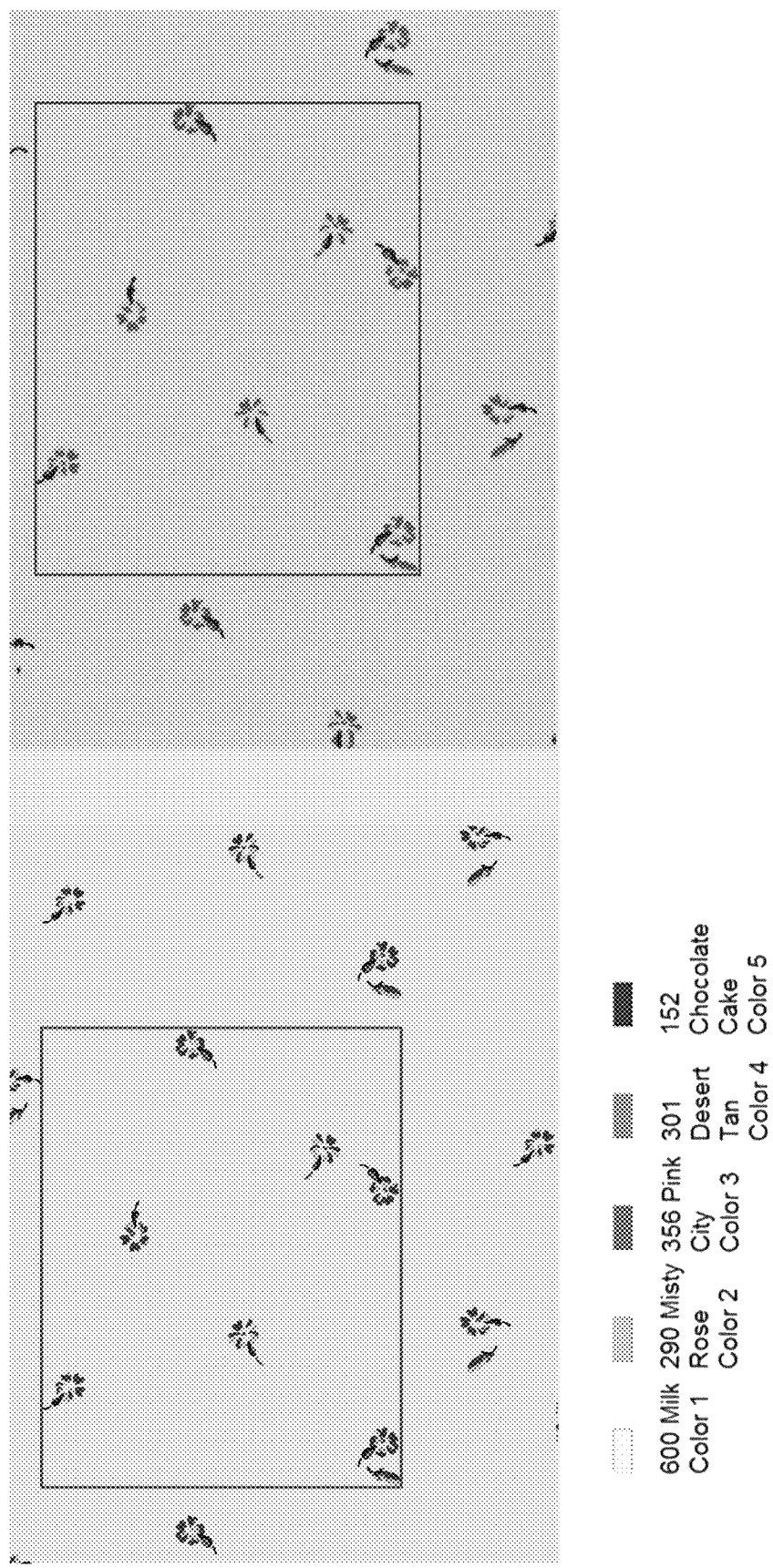
FIG. 5 shows, as an illustrative example, a CAD image of a fabric on the left and a multispectral image of a batch sample of the fabric on the right.

FIG. 5 shows an illustration of color quality assessment between a CAD image and a batch-sample image of a fabric according to one embodiment of the present disclosure.

As shown in FIG. 5, the picture on the left side represents a CAD image, which includes color information as indicated in and below the rectangular boxes under the left picture of FIG. 5. The picture on the right side is a batch-sample image of a fabric manufactured according to the CAD image. The quality assessment using a CAD image as a reference image is similar to that using a standard-sample image as a reference image. First, a user needs to select an operation area (marked with a rectangular box on the CAD image in FIG. 5) on the CAD image for quality analysis, followed by finding the corresponding operation area (marked with a rectangular box on the batch-sample image in FIG. 5) in the batch-sample image using an image matching algorithm. Since the color information of the CAD image is known, after finding the operation area in the batch-sample image by the image matching algorithm, the color information for the corresponding operation area of the batch-sample image can be compared with color information for the corresponding pixels on the operation area of the CAD image. The whole process does not require image segmentation. Adjustment of the scaling ratio of the CAD image and the corresponding batch-sample image can be included before the step of selecting the operation area. The following steps of matching and comparing color-information items from the operation area of the CAD image and from the corresponding operation area of the batch-sample image as well as the pass/fail determination are the same to the steps when the reference image is a standard-sample image. The comparison items and the pass/fail results can also be presented in a printable tabular form for intuitive visualization.

It is within the contemplation of the present disclosure that the reference image can be varied accompanied with corresponding modifications to the steps of quality assessment depending on industrial applications.

Figure 6:
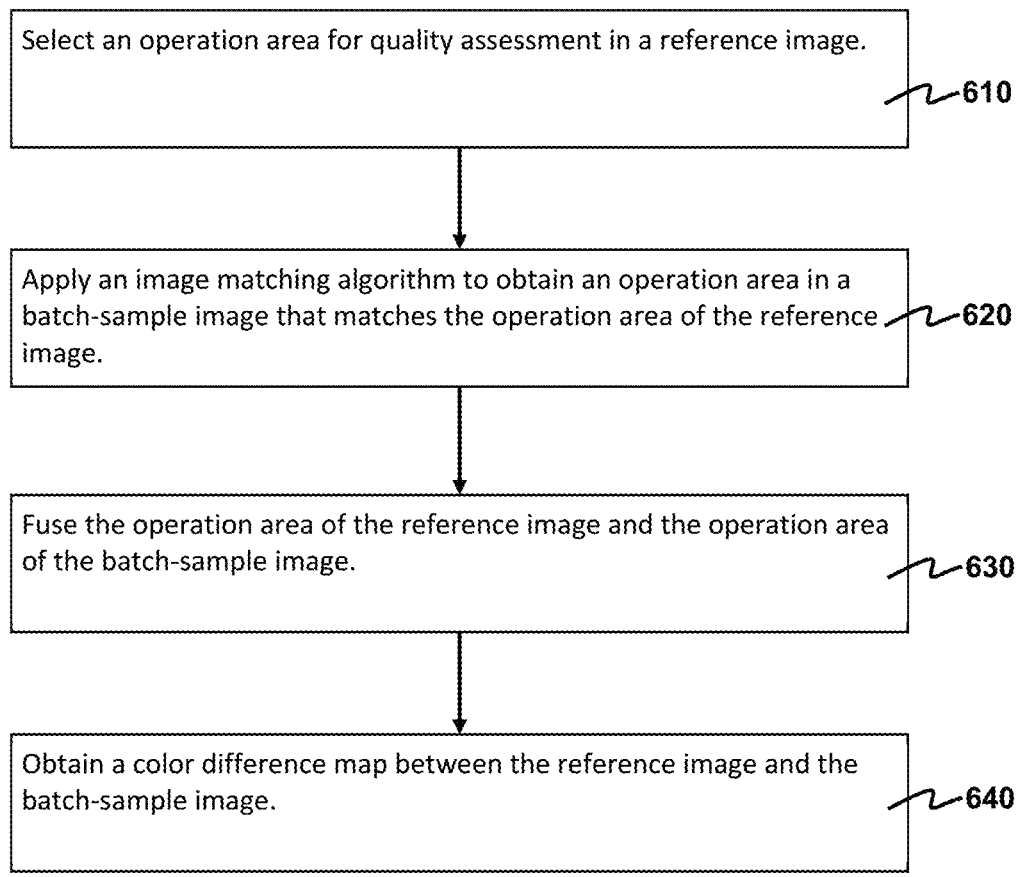
FIG. 6 is a flowchart showing the steps of quality assessment based on multispectral imaging according to another embodiment of the present disclosure.

The present disclosure also provides another method for color quality assessment based on multispectral imaging. This method provides a color difference map between the reference image and the batch-sample image, allowing a user to visually confirm whether the color and/or shape of an actual fabric product meets the standards. FIG. 6 is a flowchart of the method for color quality assessment based on multispectral imaging according to another embodiment of the present disclosure. This method includes the following steps: selecting an operation area for quality assessment in a reference image (step 610); using an image matching algorithm to acquire from the batch-sample image a corresponding operation area that matches the operation area of the reference image (step 620); fusing the operation area of the reference image with the corresponding operation area of the batch-sample image such that the corresponding operation area overlaps on the operation area (step 630); and calculating the color difference between the pixels of the operation area of the batch-sample image and the corresponding pixels of operation area of the reference image using a color difference equation to obtain a color difference map (step 640). The image matching algorithm in this embodiment is preferably the NTG model-based image matching algorithm.

Figure 7:
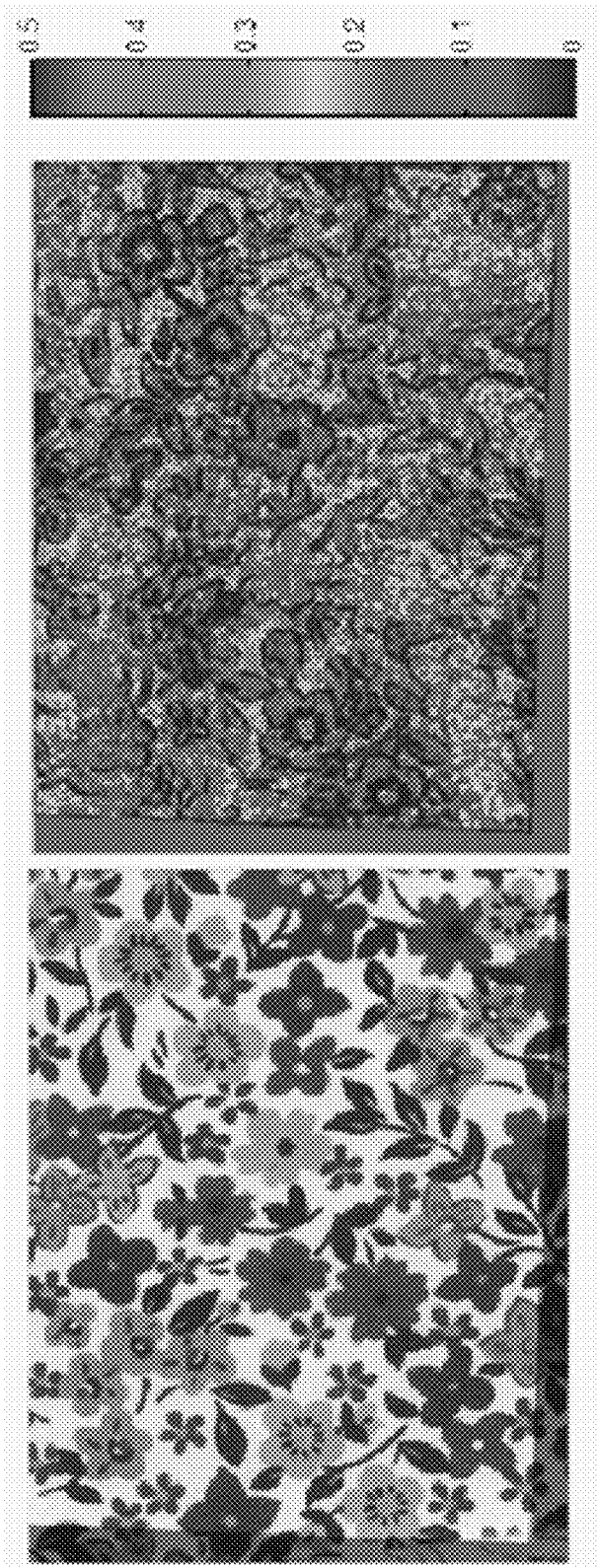
FIG. 7 shows, for illustrative purposes, color difference maps of a reference image and of a batch-sample image, wherein subplot (a) is the fused image of a reference image and a batch-sample image, subplot (b) is the color difference image of the subplot (a), subplot (c) is another fused image of another reference image and another batch-sample image, and subplot (d) is the color difference image of the subplot (c).
Figure 7:
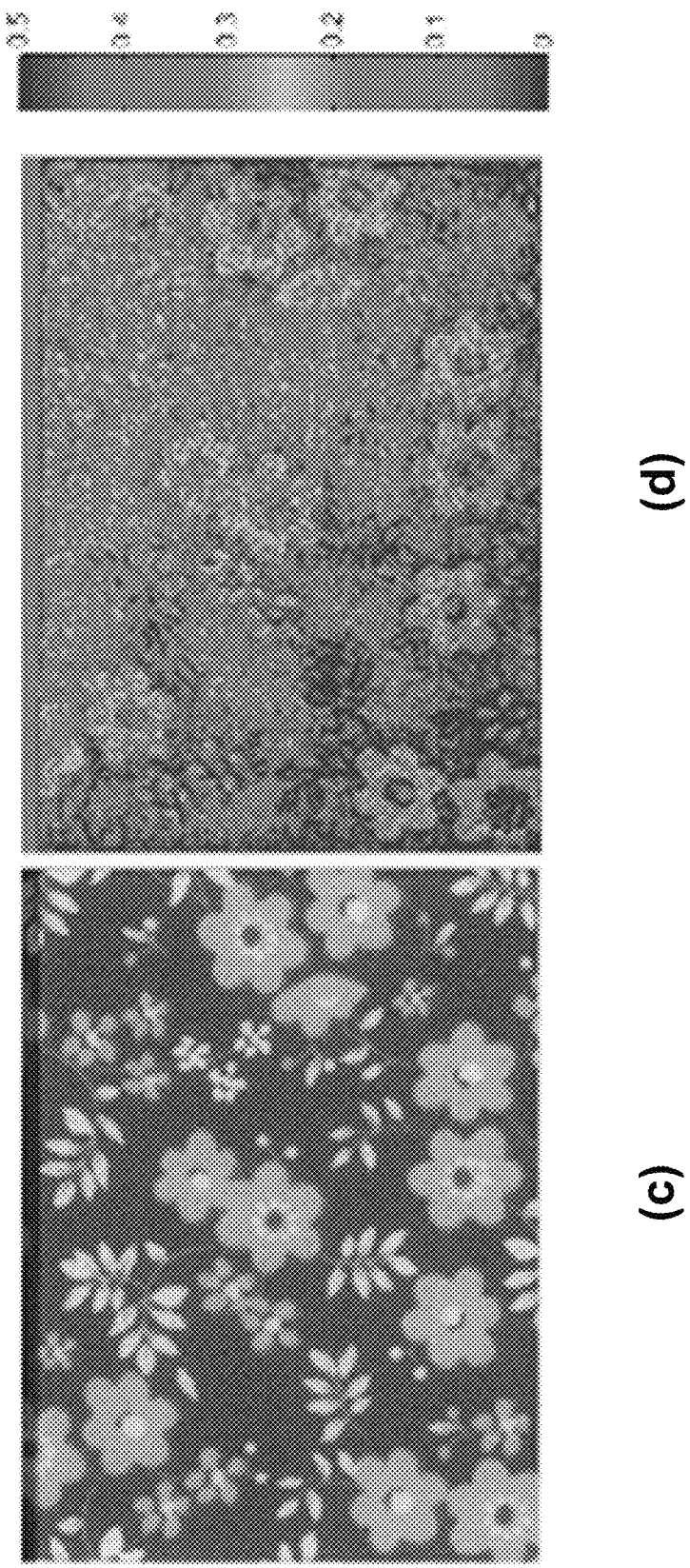

FIG. 7 shows two examples of color difference assessment based on each color difference map according to the method shown in FIG. 6. As shown in FIG. 7, subplots (a) and (c) are images obtained by fusing the standard-sample image and the batch-sample image after matching, and subplots (b) and (d) show corresponding color difference maps. The color difference map of the fabric can be obtained by the following steps: matching the batch-sample image with the standard-sample image/CAD image, followed by calculating the color difference between corresponding pixels according to the color difference equation DECMC (l:c), to obtain a color difference map.

The DECMC (l:c) color difference equation is as follows:

$$\Delta E_{CMC} = \sqrt{\left(\frac{\Delta L_{ab}^*}{lS_L}\right)^2 + \left(\frac{\Delta C_{ab}^*}{cS_c}\right)^2 + \left(\frac{\Delta H_{ab}^*}{S_H}\right)^2}$$

in which $$S_L = \begin{cases} \dfrac{0.040975 \times L^*_{ab,std}}{1 + 0.01765 \times L^*_{ab,std}}, & \text{if } L^*_{ab,std} \geq 16, \\ 0.511, & \text{if } L^*_{ab,std} < 16 \end{cases}$$

$$S_C = \dfrac{0.0638 \times C^*_{ab,std}}{1 + 0.0131 \times C^*_{ab,std}} + 0.638,$$

$$S_H = S_C \cdot (T \cdot f + 1 - f),$$

$$f = \sqrt{\dfrac{(C^*_{ab,std})^4}{[(C^*_{ab,std})^4 + 1900]}} \text{ and}$$

$$T = \begin{cases} 0.36 + |0.4\cos(h_{ab,std} + 35)|, & \text{if } h_{ab,std} \notin [164°, 345°] \\ 0.56 + |0.2\cos(h_{ab,std} + 168)|, & \text{if } h_{ab,std} \in [164°, 345°] \end{cases}$$

where: $L_{ab,std}^*$, $C_{ab,std}^*$ and $h_{ab,std}$ are the chromaticity parameters of standard color samples. These values and $\Delta L_{ab}^*$, $\Delta C_{ab}^*$, $\Delta H_{ab}^*$ of the above formula, are obtained from the CIELAB color difference equation. The brightness weighting factor l and the saturation weighting factor c are used to adjust the impact of brightness and saturation on the total color difference, and different ratios between the brightness weighting factor l and the saturation weighting factor c should be taken for different applications. In the embodiments of the present disclosure, for quality control of textile products, l:c=2:1 is adopted; for correcting the chromaticity of a digital system and for quality control of products such as coating or plastics, l:c=1:1 is adopted.

In addition to the color difference equation DECMC (l:c), other color difference equations, such as the CIEDE2000 color difference equation, the CIELAB color difference equation and the CIE94 color difference equation, etc., can also be used, and is within the contemplation of the present disclosure.

When using the CIEDE2000 color difference equation, in view of its complexity, calculating the color difference requires 4 steps, specified as follows.

Step 1: Calculate the $L^*$, $a^*$, $b^*$ and $C_{ab}^*$ in the CIELAB space in a routine manner:

$$L^* = 116 \times f\left(\dfrac{Y}{Y_n}\right) - 16,$$

$$a^* = 500 \times \left[f\left(\dfrac{X}{X_n}\right) - f\left(\dfrac{Y}{Y_n}\right)\right],$$

$$b^* = 200 \times \left[f\left(\dfrac{Y}{Y_n}\right) - f\left(\dfrac{Z}{Z_n}\right)\right] \text{ and}$$

$$C_{ab}^* = \sqrt{(a^*)^2 + (b^*)^2}.$$

In the equation, $$f(I) = \begin{cases} I^{1/3}, & I > 0.008856 \\ 7.787 \times I + 16/116, & I \leq 0.008856 \end{cases}$$

where I is $X/X_n$, $Y/Y_n$ or $Z/Z_n$.

Step 2: Calculate a', C' and h':

$$L' = L^*,$$

$$a' = (1 + G)a^*,$$

$$b' = b^*,$$

$$C' = \sqrt{(a')^2 + (b')^2} \text{ and}$$

$$h' = \tan^{-1}(b'/a').$$

In the equation, $$G = 0.5 \times \left[1 - \sqrt{\dfrac{\overline{C^*}^7}{\overline{C^*}^7 + 25^7}}\right]$$

where $\overline{C^*}$ is the arithmetic mean of the two $C^*$ values in a sample pair.

Step 3: Calculate ΔL', ΔC' and ΔH':

$$\Delta L' = L'_b - L'_s,$$

$$\Delta C' = C'_b - C'_s \text{ and}$$

$$\Delta H' = 2\sqrt{C'_b \cdot C'_s} \times \sin\left(\dfrac{\Delta h'}{2}\right)$$

in which $$\Delta h' = h'_b - h'_s$$

where the subscript "b" indicates the batch sample in the sample pair and the subscript "s" indicates the standard sample.

Step 4: Calculate CIEDE2000 color difference, $\Delta E_{00}$:

$$\Delta E_{00} = \sqrt{\left(\dfrac{\Delta L'}{k_L S_L}\right)^2 + \left(\dfrac{\Delta C'}{k_C S_C}\right)^2 + \left(\dfrac{\Delta H'}{k_H S_H}\right)^2 + R_T \cdot \left(\dfrac{\Delta C'}{k_C S_C}\right) \cdot \left(\dfrac{\Delta H'}{k_H S_H}\right)}.$$

In the equation, $$S_L = 1 + \dfrac{0.015 \times (\overline{L'} - 50)^2}{\sqrt{20 + (\overline{L'} - 50)^2}},$$

$$S_C = 1 + 0.045 \times \overline{C'},$$

$$S_H = 1 + 0.015 \times \overline{C'} \times T,$$

$$T = 1 - 0.17\cos(\overline{h'} - 30°) + 0.24\cos(3\overline{h'} + 6°) - 0.20\cos(4\overline{h'} - 63°),$$

$$R_T = -R_C \times \sin(2\Delta\theta),$$

$$\Delta\theta = 30\exp\{-[(\overline{h'} - 275°)/25]^2\} \text{ and}$$

$$R_C = \sqrt{2 \times \dfrac{\overline{C'}^7}{\overline{C'}^7 + 25^7}}$$

where $\overline{L'}$, $\overline{C'}$ and $\overline{h'}$ are the arithmetic means of L', C' and h' values (in degrees) of the two color samples in the sample pair, respectively. When calculating $\overline{h'}$, if the hue angles of the two colors are in different quadrants, special care needs to be taken to avoid errors. For example, if the hue angle of a batch sample and the hue angle of a standard sample in a sample pair is 90° and 300°, respectively, the directly calculated average is 195°, whereas the correct result is 15°. The actual calculation can be checked using the absolute difference between the two hue angles. If the difference is less than 180°, the arithmetic mean should be used directly; otherwise, if the difference is greater than 180°, 360° should be subtracted from the larger hue angle before calculating the arithmetic mean. Therefore, in the above example, for the batch-sample, 300°−360°=−60° is calculated first, followed by further calculating the arithmetic average of the hue angles of the two colors in the sample pair as (90°−60°)/2=150.

The parameters $k_L$, $k_C$, $k_H$ of the CIEDE2000 color difference equation are still used to modify changes in the actual observation experimental conditions. Therefore, the environmental conditions can be evaluated according to the specific color difference, and a similar method as that in the related color difference equation is adopted for analysis and definition.

The CIELAB color difference equation is as follows:

$$\Delta C_{ab}^* = \sqrt{(\Delta a^*)^2 + (\Delta b^*)^2},$$

$$\Delta E_{ab}^* = \sqrt{(\Delta L^*)^2 + (\Delta a^*)^2 + (\Delta b^*)^2}$$

and $$\Delta H_{ab}^* = \sqrt{(\Delta E_{ab}^*)^2 - (\Delta L^*)^2 - (\Delta C_{ab}^*)^2}$$

where: $\Delta C_{ab}^*$, $\Delta E_{ab}^*$ and $\Delta H_{ab}^*$ are the chromaticity difference, the total color difference and the hue difference, respectively; $\Delta L^*$, $\Delta a^*$ and $\Delta b^*$ are respectively the corresponding value differences between the standard-sample color and batch-sample color in the LAB color space.

The CIE94 color difference equation is as follows:

$$\Delta E_{94}^* \sqrt{\left(\frac{\Delta L^*}{k_L S_L}\right)^2 + \left(\frac{\Delta C_{ab}^*}{k_C S_C}\right)^2 + \left(\frac{\Delta H_{ab}^*}{k_H S_H}\right)^2}.$$

In the equation, $S_L = 1,$ $S_C = 1 + 0.045 \times C_{ab}^*$ and $S_H = 1 + 0.015 \times C_{ab}^*$ where: $\Delta L^*$, $\Delta C_{ab}^*$ and $\Delta H_{ab}^*$ are calculated by the CIELAB color difference equation; and $C_{ab}^*$ generally refers to CIELAB chromaticity of standard color samples, $C_{ab}^* = [(a^*)^2 + (b^*)^2]^{1/2}$, but when the tested sample is regardless of the standard sample and the batch sample, the geometric mean of two color sample chromaticity values is taken as $C_{ab}^*$, i.e. $C_{ab}^* = [C_{ab,1}^* \cdot C_{ab,2}^*]^{1/2}$.

Considering the color transition at the edge of the image, the corresponding edge also appears in the color difference map and hence affects the assessment. The edge part is suppressed in the color difference map in accordance with the following equation:

$$O(x,y) = I(x,y) \cdot \exp(-\|\nabla I(x,y)\|^\kappa)$$

and $$\|\nabla I(x,y)\| = \sqrt{I_x^2(x,y) + I_y^2(x,y)}$$

where: (x,y) is the space pixel coordinates; I(x,y) is the color difference map; $I_x(x,y)$ and $I_y(x,y)$ are the gradients at (x,y) along the x and y directions of the image, respectively; O(x,y) is the image after suppressing the edge; and κ is the correlation coefficient.

In addition, since the fabric is non-rigid, it cannot guarantee that each pixel is well aligned, and the color difference calculated directly from corresponding pixels results in salt-and-pepper like noise. Preferably, the method of the present disclosure includes performing median filtering on the color difference map after edge suppression.

In this embodiment as illustrated in FIG. 7, the heat map color scales on the right leads to a result that the color difference between the standard-sample image and the batch-sample image. A large value means that the color difference is large, and vice versa. Results from the color difference analysis show that: the white color, light blue color and dark blue color in the first pair of samples have large color differences, whereas the color difference for the yellow color is relatively smaller; and the color difference for the pink color in the second pair of samples is relatively larger as compared to other colors in this pair of samples. The concept of a color difference map offers another intuitive analytical approach for quality assessment of fabric colors.

The above-mentioned method of generating a color difference map between the reference image and the batch-sample image can be applied alone to provide an intuitive spatial depiction for a user to determine whether or not a batch sample passes the quality assessment and whether or not the sample is a qualified one in mass production. More importantly, the color difference map offers a unique opportunity for a user to identify local regions on the batch-sample image with large color differences from a reference image at a very high resolution as illustrated in subplots (b) and (c) of FIG. 7. As a result, a user can perform corresponding modifications to the batch sample more precisely and quickly. It is not possible when using traditional manual quality assessment in the textile industry.

In addition, steps for generating a color difference map can also be combined with the steps of generating a table containing color comparison items and pass/fail results, as exemplified in step 114 shown in FIG. 1. The combination of a color comparison table and a color difference map double confirms the assessment results, and provides a more objective, more robust, and more reliable method of quality assessment as compared to conventional quality assessment that is largely dependent on a user's experience and subjective judgement.

While the present disclosure has been described by way of specific examples, those skilled in the art will appreciate that various modifications and equivalents can be made without departing from the scope of the present disclosure. In addition, various modifications or substitutions may be made to the present disclosure for specific situations or application requirements without departing from the scope of the present disclosure. Therefore, the present disclosure is not limited to the specific embodiments disclosed, and includes all the embodiments within the scope of the claims of the present disclosure.

What is claimed is:

1. A computer-implemented method for color quality assessment of a batch-sample image based on multispectral imaging, the method comprising the steps of:
   (a) selecting an operation area on a reference image, wherein the reference image is used for color comparison with the batch-sample image to determine whether the batch-sample image satisfies a pass requirement;

(b) locating a corresponding operation area on the batch-sample image for color comparison, wherein the corresponding operation area on the batch-sample image matches the operation area on the reference image;

(c) generating a first plurality of color-information items for the reference image based on colors measured at a plurality of first locations on the operation area, and a second plurality of color-information items for the batch-sample image based on colors measured at a plurality of second locations on the corresponding operation area, wherein the first locations on the operation area respectively correspond to the second locations on the corresponding operation area;

(d) comparing the first and second pluralities of color-information items to obtain a plurality of comparison results; and (e) determining whether the batch-sample image satisfies the pass requirement, wherein the step (e) includes checking the plurality of comparison results with one or more thresholds.

2. The method of claim 1, wherein the plurality of comparison results comprises a plurality of color differences each being a difference in color between one of the first locations and a respective second location.

3. The method of claim 1, wherein the step (b) includes using an image matching algorithm to locate the corresponding operation area, and wherein the image matching algorithm is selected from a NTG-model based image matching algorithm, a classical SIFT algorithm, a MAD algorithm, a SAD algorithm and a NCC algorithm.

4. The method of claim 1, wherein the plurality of second locations on the corresponding operation area in the step (c) are obtained by manual selection or automatic matching, so that the first locations on the operation area respectively correspond to the second locations on the corresponding operation area.

5. The method of claim 1, wherein the step (c) includes applying an image segmentation algorithm to the operation area and to the corresponding operation area to obtain the first and second pluralities of color-information items, respectively.

6. The method of claim 5, wherein the image segmentation algorithm is a K-Means clustering based image segmentation algorithm.

7. The method of claim 1, further comprising the steps of:
(f) fusing the reference image with the batch-sample image such that the corresponding operation area overlaps on the operation area; and
(g) obtaining a color difference map between the reference image and the batch-sample image according to a color difference equation.

8. The method of claim 7, wherein the color difference equation is selected from a DECMC (2:1), a CIEDE2000, a CIELAB, and a CIE94.

9. The method of claim 7, further comprising the step (h) of suppressing an edge part of the color difference map according to:

$$O(x,y)=I(x,y)\cdot\exp(-\|\nabla I(x,y)\|^{\kappa})$$

and $$\|\nabla I(x,y)\|=\sqrt{I_x^2(x,y)+I_y^2(x,y)}$$

where:
(x,y) represents a pixel coordinate of the color difference map;

I(x,y) is the color difference map;

$I_x(x,y)$ and $I_y(x,y)$ are gradients of the color difference map at (x,y) along x and y directions, respectively;

O(x,y) is a color difference at (x,y) after suppressing the edge part at (x,y); and κ is a correlation coefficient.

10. The method of claim 1, wherein the reference image is a CAD image or a standard-sample image.

11. The method of claim 1, wherein the reference image is a standard-sample image, and wherein the step (c) includes:

selecting a first plurality of seed points having mutually different colors on the operation area of the standard-sample image, wherein the first plurality of seed points form the plurality of first locations;

identifying a second plurality of seed points on the corresponding operation area of the batch-sample image, wherein the second plurality of seed points corresponds to the first plurality of seed points in position, and form the plurality of second locations; and applying an image segmentation algorithm to the operation area and to the corresponding operation area to obtain the first and second pluralities of color-information items, respectively.

12. The method of claim 11, wherein the image segmentation algorithm is a K-Means clustering based image segmentation algorithm.

13. The method of claim 1, wherein the plurality of comparison results and whether the batch-sample image satisfies the pass requirement are presented in a printable tabular form.

14. A computer-implemented method for color quality assessment of a batch-sample image based on multispectral imaging, the method comprising the steps of:

(a) selecting an operation area on a reference image, wherein the reference image is used for color comparison with the batch-sample image to determine whether the batch-sample image satisfies a pass requirement;

(b) locating a corresponding operation area on a batch-sample image for color comparison, wherein the corresponding operation area on the batch-sample image matches the operation area on the reference image;

(c) fusing the reference image with the batch-sample image such that the corresponding operation area overlaps on the operation area; and (d) obtaining a color difference map between the reference image and the batch-sample image according to a color difference equation, the color difference map being used for color quality assessment.

15. The method of claim 14, wherein the step (b) includes using an image matching algorithm to locate the corresponding operation area, and wherein the image matching algorithm is selected from a NTG-model based image matching algorithm, a classical SIFT algorithm, a MAD algorithm, a SAD algorithm and a NCC algorithm.

16. The method of claim 14, wherein the color difference equation is selected from a DECMC (2:1), a CIEDE2000, a CIELAB, and a CIE94.

17. The method of claim 16, further comprising the step (e) of suppressing an edge part of the color difference map according to:

$$O(x,y) = I(x,y) \cdot \exp(-\|\nabla I(x,y)\|^\kappa)$$

and $$\|\nabla I(x,y)\| = \sqrt{I_x^2(x,y) + I_y^2(x,y)}$$

where:
- (x,y) represents a pixel coordinate of the color difference map;
- I(x,y) is the color difference map;
- $I_x(x,y)$ and $I_y(x,y)$ are gradients of the color difference map at (x,y) along x and y directions, respectively;
- O(x,y) is a color difference at (x,y) after suppressing the edge part at (x,y); and
- κ is a correlation coefficient.

18. The method of claim 14, wherein the reference image is a CAD image or a standard-sample image.

19. A non-transitory computer-readable storage medium having stored thereon computer instructions, wherein the computer instructions, when executed by a processor, causes the processor to perform color quality assessment of a batch-sample image according to the method of claim 1.

20. A non-transitory computer-readable storage medium having stored thereon computer instructions, wherein the computer instructions, when executed by a processor, causes the processor to perform color quality assessment of a batch-sample image according to the method of claim 14.

* * * * *